United States Patent
Temple et al.

(10) Patent No.: US 11,307,212 B2
(45) Date of Patent: Apr. 19, 2022

(54) TISSUE PROCESSING APPARATUS FOR PROCESSING BIOLOGICAL TISSUE

(71) Applicant: SHANDON DIAGNOSTICS LIMITED, Cheshire (GB)

(72) Inventors: John Temple, Cheshire (GB); Michael James Forshaw, Cheshire (GB); David John Chan, Cheshire (GB)

(73) Assignee: SHANDON DIAGNOSTICS LIMITED, Cheshire (GB)

( * ) Notice: Subject to any disclaimer, the term of this patent is extended or adjusted under 35 U.S.C. 154(b) by 0 days.

(21) Appl. No.: 17/353,839

(22) Filed: Jun. 22, 2021

(65) Prior Publication Data

US 2021/0311086 A1 Oct. 7, 2021

Related U.S. Application Data (63) Continuation of application No. 16/097,899, filed as application No. PCT/EP2017/058565 on Apr. 10, 2017, now abandoned.

(30) Foreign Application Priority Data

May 5, 2016 (GB) .................... 1607882

(51) Int. Cl.
  *G01N 35/10* (2006.01)
  *G01N 1/31* (2006.01)
  (Continued)

(52) U.S. Cl.
  CPC .......... *G01N 35/1002* (2013.01); *G01N 1/31* (2013.01); *G01N 1/38* (2013.01); *G01N 35/10* (2013.01);
  (Continued)

(58) Field of Classification Search
  CPC ...... G01N 35/1002; G01N 35/10; G01N 1/31; G01N 1/38; G01N 2035/00673; G01N 2035/1062
  See application file for complete search history.

(56) References Cited

U.S. PATENT DOCUMENTS 4,838,999 A    6/1989   Hans-Peter et al.
5,800,056 A *   9/1998   Suzuki ................ B01J 19/0006
                                                                 366/152.4

(Continued)

FOREIGN PATENT DOCUMENTS

WO    2007062649 A1   6/2007
WO    2013036941 A2   3/2013

OTHER PUBLICATIONS

Feldman et al., "Tissue Processing and Hematoxylin and Eosin Staining", 2014, Springer Science+Business Media, Histopathology: Methods and Protocols, Methods in Molecular Biology, vol. 1180, pp. 31-43. (Year: 2014).*

(Continued)

*Primary Examiner* — Jennifer Wecker
*Assistant Examiner* — Kathryn Elizabeth Limbaugh
(74) *Attorney, Agent, or Firm* — NK Patent Law (57) ABSTRACT

A tissue processing apparatus for processing biological tissue. The tissue processing apparatus comprises a measurement probe that includes two measurement surfaces spaced apart from each other, wherein the measurement probe is configured to be inserted into a reagent receptacle so that the two measurement surfaces are at least partially immersed in reagent contained in the reagent receptacle. The tissue processing apparatus is configured to use the two measurement surfaces of the measurement probe to obtain at least one electrical measurement of reagent contained in the reagent receptacle before reagent is taken out from the reagent receptacle by the tissue processing apparatus. The (Continued)

tissue processing apparatus is configured to determine, based on the at least one electrical measurement, a concentration and/or a type of reagent contained in the reagent receptacle.

14 Claims, 7 Drawing Sheets

(51) Int. Cl.
  *G01N 1/38* (2006.01)
  *G01N 35/00* (2006.01)
(52) U.S. Cl.
  CPC .............. *G01N 2035/00673* (2013.01); *G01N 2035/1062* (2013.01)

(56) References Cited

U.S. PATENT DOCUMENTS

| | | | |
|---|---|---|---|
| 7,875,245 | B2* | 1/2011 | Favuzzi ........... G01N 35/00871 422/403 |
| 2008/0072664 | A1 | 3/2008 | Hansen et al. |
| 2010/0247383 | A1 | 9/2010 | Okubo et al. |
| 2011/0184570 | A1 | 7/2011 | Nakanishi et al. |
| 2011/0223077 | A1 | 9/2011 | Tanaka et al. |
| 2011/0240535 | A1 | 10/2011 | Pehrson et al. |
| 2014/0004552 | A1 | 1/2014 | Favuzzi et al. |
| 2014/0296089 | A1* | 10/2014 | Holmes ..................... B01L 9/06 506/9 |
| 2018/0290457 | A1 | 10/2018 | Ge et al. |

OTHER PUBLICATIONS

ISA/EP International Search Report for International Application No. PCT/EP2017/058565 dated Mar. 7, 2017.
ISA/EP; Written Opinion for International Application No. PCT/EP2017/058565 dated Mar. 7, 2017.
IPO; Search Report for Great British Application No. 1607882.6 dated Jul. 28, 2016.
USPTO; Non-Final Office Action for U.S. Appl. No. 16/097,899 dated Dec. 22, 2020, 24 pages.
USPTO; Final Office Action for U.S. Appl. No. 16/097,899 dated Apr. 8, 2021, 16 pages.
Feldman, Ada T. et al., Tissue Processing and Hematoxylin and Eosin Staining. Jun. 18, 2014, Histopathology. Methods in Molecular Biology (Methods and Protocols), vol. 1180, p. 31-43.

* cited by examiner

TISSUE PROCESSING APPARATUS FOR PROCESSING BIOLOGICAL TISSUE

CROSS-REFERENCE TO RELATED APPLICATIONS

This application claims priority to U.S. Utility application Ser. No. 16/097,899 filed on Oct. 31, 2018 and entitled "Tissue Processing Apparatus for Processing Biological Tissue," which is a 371 National Stage application of PCT/EP2017/058565 filed on Apr. 10, 2017, which claims priority to UK Patent Application No. 1607882.6 filed on May 5, 2016, the contents of all of which are incorporated by reference herein.

FIELD OF THE INVENTION

This invention relates to a tissue processing apparatus for processing biological tissue.

BACKGROUND

When biological tissue samples are collected, it is common to prepare the samples for analysis, e.g. for viewing under a microscope. One method of preparation is to process the tissue samples by treating the biological tissue using various fluids and then to embed each sample in an embedding medium, typically a block of paraffin wax. The various fluids used to treat the samples typically include reagents such as: fixatives, alcohols and hydrocarbon solvents. Biological tissue is typically processed by a tissue processing apparatus. Prior to processing biological tissue in a tissue processing apparatus, the biological tissue is typically stored in a fixative such as Formaldehyde. Within a typical tissue processing apparatus, biological tissue is first treated with alcohol, and then with a hydrocarbon solvent, such as Xylene. Finally, the tissue processing apparatus treats the biological tissue with paraffin wax (an embedding medium) so as to infiltrate and fill the biological tissue with the wax. It typically takes 14 hours for the tissue processing apparatus to complete this process.

Next, the biological tissue is embedded in a block of paraffin wax by a tissue embedding apparatus, which may be referred to as an "embedding centre", in which the biological tissue (now filled with wax) is placed in a mould then filled with paraffin wax, which is rapidly cooled to form a solidified block of paraffin wax of predetermined shape and size (determined by the mould) containing the biological tissue. The predetermined shape and size of the block is chosen so that the solidified block is of a suitable shape and size to be used in a microtome, where the biological tissue can be cut into very fine slices that are suitable for use under a microscope.

The present inventors have observed that processing the biological tissue with the wrong state and/or type of reagent can cause serious problems in the tissue preparation procedure. For example, initially treating biological tissue with pure alcohol can cause the biological tissue to be damaged. To reduce the likelihood of damaging biological tissue, tissue processing apparatuses are normally configured to treat biological tissue in stages. For the case of alcohol, the concentration of the alcohol used to treat the biological tissue is gradually reduced, starting from a dilute form and progressing towards a less dilute (purer) form. The aim is to prevent any degradation of the biological tissue during the tissue processing procedure that might render the biological tissue unsuitable for use.

In earlier models of tissue processing apparatus such as the Pathcentre® Enclosed Tissue Processor, a rotary valve system was used which selected one reagent receptacle from a number of reagent receptacles. In such models, there would typically be 16 to 20 reagent receptacles stored in the tissue processing apparatus, each of which contained a different state and/or type of reagent. The rotary valve system was configured to select the reagent receptacles in the required order, so as to treat the biological tissue with increasing strengths of the correct reagent. However, these models of tissue processing apparatuses generally required a technician to expend significant time and effort to ensure that each reagent receptacle contained the correct state and/or type of reagent, prior to the contents of that reagent receptacle being used in the tissue processing apparatus.

A more recent tissue processing apparatus made by Thermo Fisher Scientific under the name "Shandon Excelsior", referred to herein as an "Excelsior" tissue processor uses so-called "in-process" reagent management. The Excelsior tissue processor has multiple different reagent containing reagent receptacles, some of which contain alcohol of varying strengths, and others of which contain xylene of varying purity. Unlike the Pathcentre® rotary valve system, the "in-process" reagent management performed by the Excelsior tissue processor only requires the input of reagent receptacles containing pure alcohol and pure xylene, with other concentrations of alcohol and purity of xylene being obtained and controlled through use of the apparatus itself.

The Excelsior tissue processor also has a floating buoy mechanism that is used to obtain specific gravity measurements of alcohol used by the tissue processor. These specific gravity measurements are used to infer the concentration of reagent in other reagent receptacles so that a determination can be made on when a new reagent receptacle containing new reagent is required.

The present inventors have observed a problem with existing tissue processing apparatuses in that, when a user is prompted to connect an extraction device of the tissue processing apparatus to a reagent receptacle containing reagent of a specified type and state (e.g. 100% alcohol, 100% xylene), sometimes the user forgets to perform this action or accidentally connects the extraction device to a reagent receptacle containing reagent that does not match the specified state and/or type of reagent. If a reagent of a wrong state and/or type is used by the tissue processing apparatus, this can cause irreversible damage to the biological tissue. However, these problems may not become apparent until after the biological tissue has been processed by the apparatus (which as noted above can take 14 hours).

The present invention has been devised in light of the above considerations.

SUMMARY OF THE INVENTION

A first aspect of the invention may provide: a tissue processing apparatus for processing biological tissue, the tissue processing apparatus comprising: a measurement probe that includes two measurement surfaces spaced apart from each other, wherein the measurement probe is configured to be inserted into a reagent receptacle so that the two measurement surfaces are at least partially immersed in reagent contained in the reagent receptacle; wherein the tissue processing apparatus is configured to use the two measurement surfaces of the measurement probe to obtain at least one electrical measurement of reagent contained in the reagent receptacle before reagent is taken out from the reagent receptacle by the tissue processing apparatus;

wherein the tissue processing apparatus is configured to determine, based on the at least one electrical measurement, a state and/or a type of reagent contained in the reagent receptacle.

In this way, the state and/or the type of reagent contained in the reagent receptacle can be determined before reagent is taken out of the reagent receptacle. This allows, for example, the tissue processing apparatus to provide an indication to a user if it is determined that the state and/or type of the reagent contained in the reagent receptacle does not match a specified state and/or type.

The tissue processing apparatus may have an extraction device configured to take reagent out of the reagent receptacle, when connected to (e.g. inserted into) the reagent receptacle.

The extraction device may be an inlet tube configured to take reagent out of the reagent receptacle via a reagent opening in the inlet tube, when inserted into the reagent receptacle. The reagent opening in the inlet tube may be located at an end of the inlet tube.

Preferably, the measurement probe is mounted to the inlet tube. In this way, the measurement probe can be assumed to be in the same reagent as the inlet tube.

Preferably, the measurement probe is mounted to the inlet tube such that at least part of the measurement probe is located adjacent to the reagent opening in the inlet tube. In this way, the measurement probe can be exposed to reagent similar to the reagent that will be taken out of the reagent receptacle by the inlet tube.

The measurement probe may have a sample chamber, wherein one of the two measurement surfaces includes at least one wall of the sample chamber, and the other of the two measurement surfaces is housed within the at least one wall of the sample chamber. The at least one wall of the sample chamber may be a cylindrical wall. The sample chamber may be open at two (preferably opposite) ends to allow reagent in the reagent receptacle to pass through the sample chamber.

The inlet tube may have one or more walls which define a compartment configured to house the measurement probe, wherein the one or more walls which define the compartment are integrally formed with the remainder of the inlet tube.

Preferably, the compartment includes a compartment opening that is located adjacent to the reagent opening in the inlet tube. The compartment preferably includes a further opening which is preferably located at an opposite end of the compartment.

Preferably, each measurement surface of the measurement probe is electrically conductive, and may be a metal such as stainless steel.

The at least one electrical measurement may be indicative of the capacitance and/or the resistance of the reagent.

Preferably, the tissue processing apparatus includes signal generating circuitry configured to generate an electrical test signal that is supplied to at least one of the two measurement surfaces, and signal processing circuitry configured to obtain the at least one electrical measurement by processing an electrical signal received from at least one of the two measurement surfaces in consequence of the electrical test signal having been supplied to at least one of the two measurement surfaces.

Figure 6:
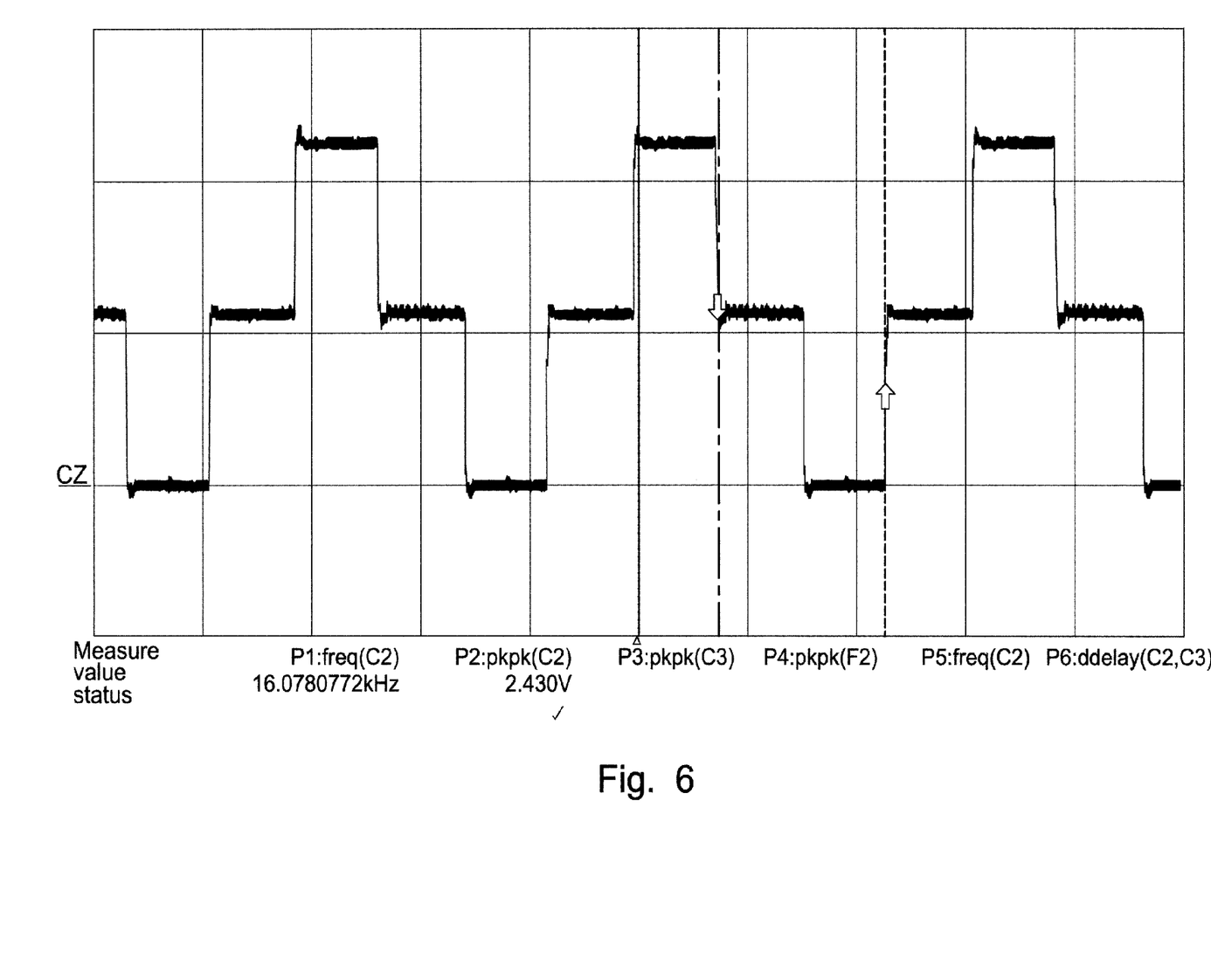
FIG. 6 is a graph showing an example stepped AC waveform that could be used as an electrical test signal.

Preferably, the electrical test signal is an AC voltage. The AC voltage may be a stepped AC signal that oscillates between two or more (preferably three or more) discrete voltages (e.g. as shown in FIG. 6).

Preferably, the signal processing circuitry includes circuitry housed in a cap for use with a reagent receptacle. The cap may be a screw cap.

In this way, at least some of the signal processing circuitry can be provided reasonably close to the measurement surfaces of the measurement probe, without requiring that circuitry to be submersed in reagent contained in the reagent receptacle (which might be impractical). This helps to reduce the risk of the electrical signal received from at least one of the two measurement surfaces getting contaminated in transit to the signal processing circuitry. Also, a cap is easily transferrable between different reagent receptacles whilst remaining connected to the tissue processing apparatus (as may be useful if a reagent receptacle needs replacing).

A state of reagent determined by the tissue processing apparatus may include a concentration of reagent. The concentration of reagent may be expressed as a percentage (by volume) of the reagent that is of a specified type of reagent (e.g. 100% alcohol). For avoidance of any doubt, the concentration of a reagent may be expressed as a state of dilution of a reagent.

A type of reagent determined by the tissue processing apparatus may include an indication of whether the reagent is one of a group of predetermined reagent types. The predetermined reagent types may include an alcohol, a hydrocarbon solvent and/or a fixative.

As discussed below with reference to FIG. 7, it is fairly straightforward to determine a concentration of a reagent and an indication of whether the reagent is one of a group of predetermined reagent types, based on an electrical measurement obtained using two measurement surfaces immersed in the reagent. In the example discussed below, this is achieved using an electrical measurement indicative of capacitance, but the inventors note that other electrical measurements may equally be used. The tissue processing apparatus may be configured to determine a state and/or a type of reagent contained in the reagent receptacle by comparing the at least one electrical measurement with at least one reference value. This may be referred to as determining a state and/or a type of reagent based on an "absolute comparison". The at least one reference value may be determined empirically (by experiment), for example.

Alternatively, the tissue processing apparatus may be configured to determine a state and/or type of reagent contained in the reagent receptacle by comparing the at least one electrical measurement with at least one electrical measurement previously obtained using the measurement probe. This may be referred to as determining a state and/or a type of reagent based on an "relative comparison". The at least one electrical measurement previously obtained using the measurement probe could be obtained when the at least two surfaces of the measurement probe were at least partially immersed in reagent that the tissue processing apparatus had deemed as requiring replacement, for example.

Other ways in which the tissue processing apparatus could be configured to determine, based on the at least one electrical measurement, a state and/or a type of reagent contained in the reagent receptacle would be apparent to a skilled person.

Preferably, the tissue processing apparatus is configured to: provide an indication to a user (e.g. via a display of the tissue processing apparatus) to connect an extraction device of the tissue processing apparatus to a reagent receptacle containing reagent of a specified type and state (e.g. 100% alcohol, e.g. 100% xylene); after the user has connected the extraction device to a reagent receptacle: using the two measurement surfaces of the measurement probe to obtain at least one electrical measurement of reagent contained in the reagent receptacle before reagent is taken out from the reagent receptacle by the extraction device; determining, based on the at least one electrical measurement, a state and/or a type of reagent contained in the reagent receptacle; if the determined state and/or type of reagent contained in the reagent receptacle does not match the specified state and/or type, provide an indication to the user that the reagent contained in the reagent receptacle connected to the extraction device does not match the specified state and/or type.

The specified type and state of reagent may be a dehydrant having a concentration of X % or higher, where X is preferably 90% or higher. For example, the specified type and state of reagent may be 100% (i.e. pure) alcohol.

The specified type and state of reagent may be a hydrocarbon solvent having a concentration of X % or higher, where X is preferably 90% or higher. For example, the specified type and state of reagent may be 100% (i.e. pure) xylene.

Criteria for determining whether the determined state and/or type of reagent contained in the reagent receptacle does or does not match the specified state and/or type may involve assessing whether the at least one electrical measurement falls within at least one predetermined range corresponding to the specified state and/or type. The at least one predetermined range may be determined empirically (by experiment), for example (see e.g. FIG. 7, discussed below).

Optionally, the tissue processing apparatus may be configured to, if the determined state and/or type of reagent contained in the reagent receptacle connected to the extraction device does not match the specified state and/or type, prevent the extraction device from taking out reagent from the reagent receptacle, e.g. until the extraction device is connected to a reagent receptacle containing reagent that is determined to have a state and/or type that matches the specified state and/or type; and/or until a predetermined override procedure is carried out by a user of the tissue processing apparatus.

Reagent contained in a reagent receptacle may be one of: an alcohol, a hydrocarbon solvent or a fixative.

Preferably, the tissue processing apparatus is for processing biological tissue by treating the biological tissue with a plurality of reagents and then with an embedding medium. The plurality of reagents used to process the biological tissue may include one or more (preferably a plurality of) dehydrants and one or more (preferably a plurality of) hydrocarbon solvents. The one or more dehydrants may include a plurality of alcohol solutions having differing concentrations and/or pure alcohol. The one or more hydrocarbon solvents may include one or more xylene solutions and/or pure xylene. The embedding medium may be paraffin wax.

The tissue processing apparatus may include a control unit for controlling operation of the tissue processing apparatus. The control unit may be configured to carry out one or more of the above-described determination steps and/or provide one or more of the above-described indications to a user.

An above-described indication to a user may be provided, for example, via a display of the tissue processing apparatus, via a mobile phone application and/or via a message sent to a mobile phone. Other modes of providing information to a user could easily be envisaged by a skilled person.

The tissue processing apparatus may have a display, though this is not a requirement since indications to a user may be provided by means other than a display (as can be seen from the previous paragraph). The display could be wirelessly connected to the tissue processing apparatus (e.g. it could be a remote PC).

The tissue processing apparatus may include a cavity for housing one or more reagent receptacles.

The tissue processing apparatus may include multiple measurement probes. In this way, the tissue processing apparatus can be used to check the state and/or type of reagent contained in multiple reagent receptacles.

Each measurement probe may be as described in connection with a single measurement probe, above.

Preferably, the tissue processing apparatus includes first and second measurement probes, wherein the first measurement probe is configured to be inserted into a first reagent receptacle and the second measurement probe is configured to be inserted into a second reagent receptacle.

Preferably, the tissue processing apparatus is configured to: provide an indication to a user to connect a first extraction device of the tissue processing apparatus to a first reagent receptacle containing reagent of a first specified type and state (e.g. 100% alcohol); after the user has connected the first extraction device to a first reagent receptacle: using the two measurement surfaces of a first measurement probe to obtain at least one electrical measurement of reagent contained in the first reagent receptacle before reagent is taken out from the first reagent receptacle by the first extraction device; determining, based on the at least one electrical measurement, a state and/or a type of reagent contained in the first reagent receptacle; if the determined state and/or type of reagent contained in the first reagent receptacle does not match the first specified state and/or type, provide an indication to the user that the reagent contained in the first reagent receptacle does not match the first specified state and/or type; provide an indication to a user to connect a second extraction device of the tissue processing apparatus to a second reagent receptacle containing reagent of a second specified type and state (e.g. 100% xylene); after the user has connected the second extraction device to a second reagent receptacle: using the two measurement surfaces of the second measurement probe to obtain at least one electrical measurement of reagent contained in the second reagent receptacle before reagent is taken out from the second reagent receptacle by the second extraction device; determining, based on the at least one electrical measurement, a state and/or a type of reagent contained in the second reagent receptacle; if the determined state and/or type of reagent contained in the second reagent receptacle does not match the second specified type and/or state, provide an indication to the user that the reagent contained in the second reagent receptacle does not match the second specified state and/or type.

The first extraction device is preferably a first inlet tube of the tissue processing apparatus to which the first measurement probe is mounted, and the second extraction device is preferably a second inlet tube of the tissue processing apparatus to which the second measurement probe is mounted.

The first specified type and state of reagent may be a dehydrant having a concentration of X % or higher, where X is preferably 90% or higher. For example, the first specified type and state of reagent may be 100% alcohol.

The second specified type and state of reagent may be a hydrocarbon solvent having a concentration of X % or higher, where X is preferably 90% or higher. For example, the second specified type and state of reagent may be 100% xylene.

A second aspect of the invention may provide a method of using a tissue processing apparatus according to the first aspect of the invention.

The second aspect of the invention may therefore provide a method of using a tissue processing apparatus according to the first aspect of the invention, wherein the method includes: inserting the measurement probe into a reagent receptacle containing reagent so that the two measurement surfaces of the measurement probe are at least partially immersed in reagent contained in the reagent receptacle; using the two measurement surfaces of the measurement probe to obtain at least one electrical measurement of reagent contained in the reagent receptacle before reagent is taken out from the reagent receptacle by (e.g. an extraction device of) the tissue processing apparatus; determining, based on the at least one electrical measurement, a state and/or a type of the reagent contained in the reagent receptacle.

The method may include any method step implementing or corresponding to any apparatus feature described in connection with the first aspect of the invention.

A third aspect of the invention may provide a measurement probe configured to be used in a tissue processing apparatus according to the first aspect of the invention.

The measurement probe may have any feature described in connection with any above aspect of the invention.

For example, the measurement probe may be provided in combination with an inlet tube and/or reagent receptacle cap as described in connection with any above aspect of the invention.

The invention also includes any combination of the aspects and preferred features described except where such a combination is clearly impermissible or expressly avoided.

BRIEF DESCRIPTION OF THE DRAWINGS

Examples of these proposals are discussed below, with reference to the accompanying drawings in which.

DETAILED DESCRIPTION

In general, the following discussion describes examples of our proposals with reference to the exemplary embodiments displayed in the figures.

Figure 1:
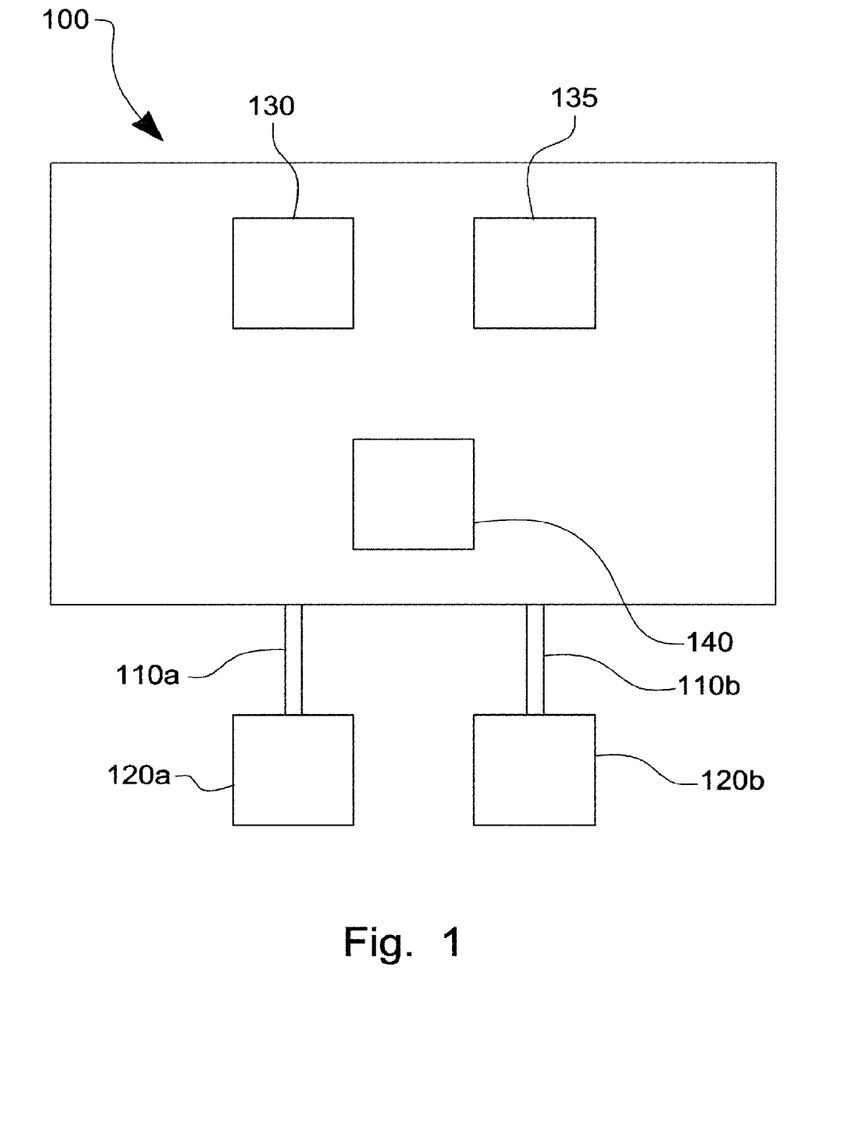
FIG. 1 is an example tissue processing apparatus.

FIG. 1 illustrates an example of a tissue processing apparatus 100 according to the present invention.

The tissue processing apparatus 100 has a first extraction device in the form of a first inlet tube 110 $a$ configured to take reagent out of a first reagent receptacle 120 $a$ via a reagent opening located at an end of the first inlet tube 110 $a$, when inserted into the first reagent receptacle 120 $a$. The tissue processing apparatus 100 also has a second extraction device in the form of a second inlet tube 110 $b$ configured to take reagent out of a second reagent receptacle 120 $b$ via a reagent opening located at an end of the second inlet tube 110 $b$, when inserted into the second reagent receptacle 120 $b$.

The reagent receptacles 120 $a$, 120 $b$ would typically be housed within a cavity inside the tissue processing apparatus 100, but in FIG. 1 they are shown externally to the tissue processing apparatus 100 for clarity.

The tissue processing apparatus 100 also includes a control unit 130 (e.g. a computer), a display 135 and signal generating circuitry 140.

Figure 2:
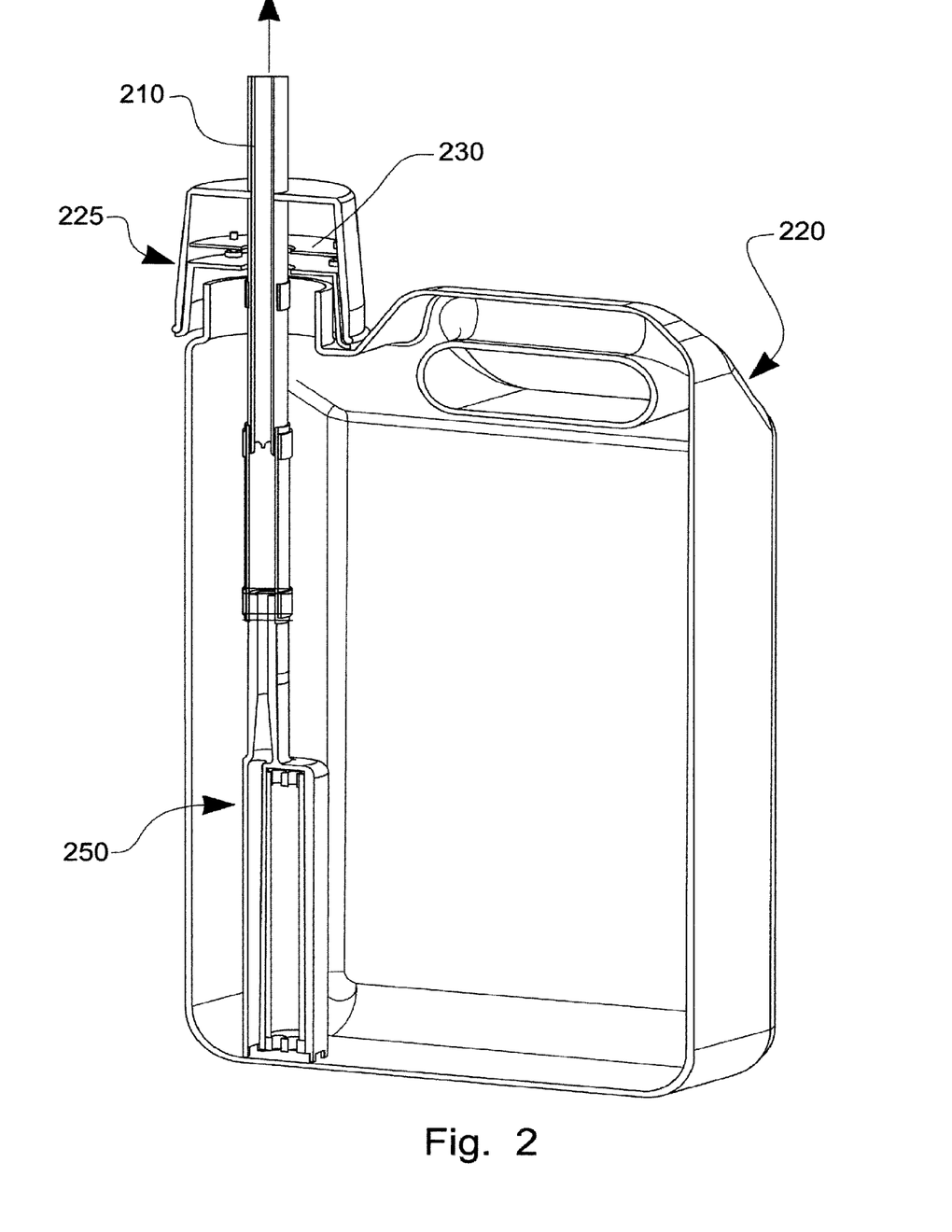
FIG. 2 is a cross-sectional view of a first example of a reagent receptacle suitable for use in the tissue processing apparatus of FIG. 1. The reagent receptacle has a first example of a measurement probe inserted into it.

FIG. 2 shows an inlet tube 210, a reagent receptacle 220 and a first example of a measurement probe 250 suitable for use in the tissue processing apparatus of FIG. 1, wherein the inlet tube 210 houses the measurement probe 250. The measurement probe 250 is only shown partially in FIG. 2, but a more detailed view of the measurement probe 250 is provided by FIG. 3, discussed in more detail below.

In this example, signal processing circuitry 230 of the tissue processing apparatus 100 is housed within a cap 225 of the reagent receptacle 220. The signal processing circuitry 230 is connected to the control unit 130 of the signal processing apparatus 100 via a connecting cable, which is omitted from FIG. 2 for clarity. The function of the signal processing circuitry 230 housed within the cap 225 is described below.

Figure 3:
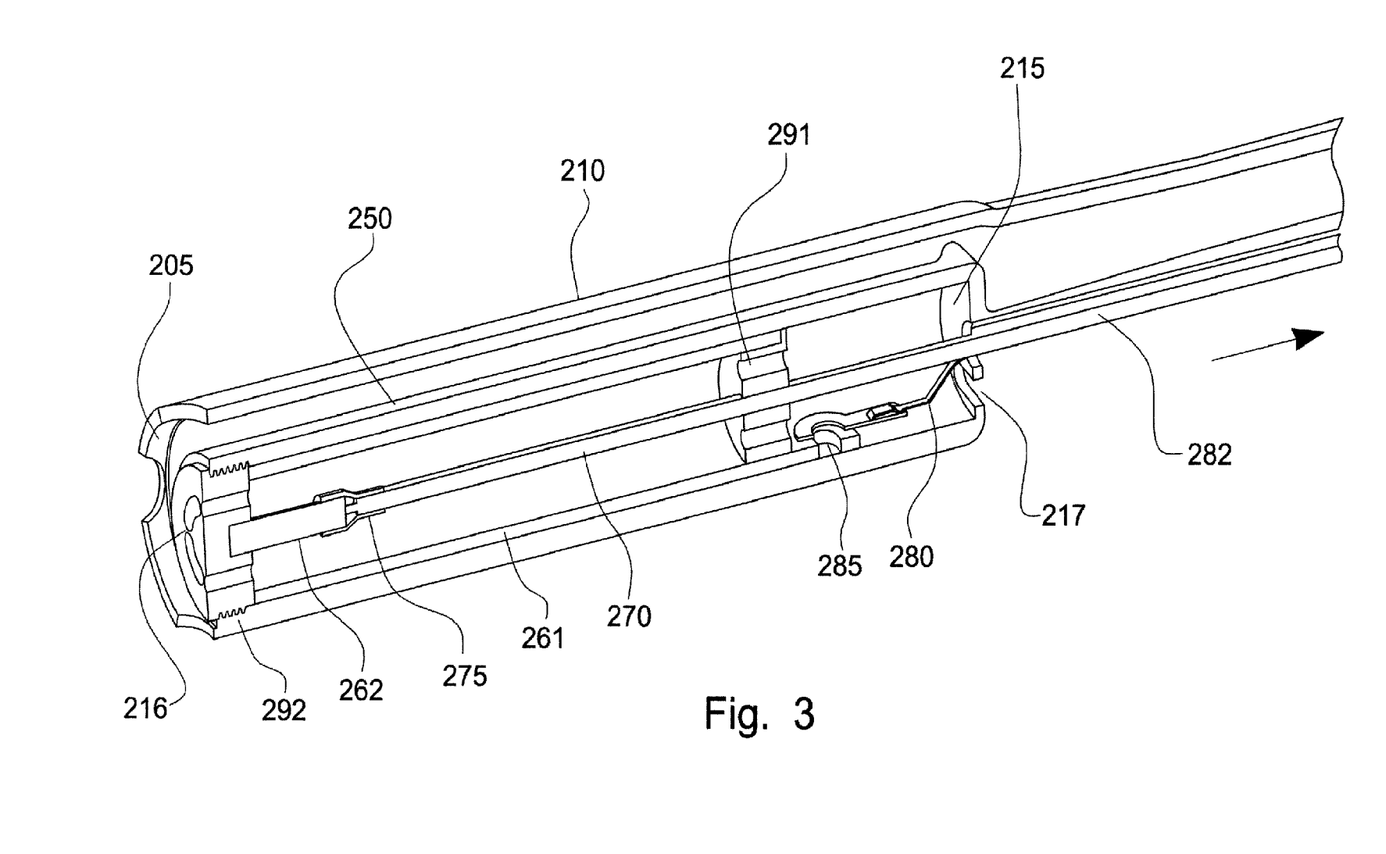
FIG. 3 is a cross-sectional view of the first example of the measurement probe.

FIG. 3 shows the measurement probe 250 and inlet tube 210 of FIG. 2 in more detail. The inlet tube 210 has a reagent opening 205 located at the end of the inlet tube 210, through which the inlet tube 210 is configured to take reagent out of the reagent receptacle 220. The inlet tube 210 has an internal wall which defines a compartment 215 configured to house the measurement probe 250. The internal wall of the inlet tube 210 is integrally formed with the remainder of the inlet tube 210. The compartment 215 includes a compartment opening 216 located adjacent to the reagent opening 205. The compartment opening 216 is formed in a measurement end cap 292 (described below). The compartment 215 is cylindrical and also includes a further compartment opening 217, which is located at the opposite end of the compartment 215 to the compartment opening 216, so as to allow reagent to flow through the compartment 215 and the measurement probe 250. At the same end of the compartment 215 as the further compartment opening 217, there is a small hole (unlabelled) to allow the coaxial cable 282 (described below) to pass into the compartment 215.

A standard inlet tube for a reagent receptacle of the type used in tissue processing apparatuses is typically 12 mm to 13 mm in diameter. In contrast, the combination of the measurement probe 250 and the inlet tube 210 shown in FIG. 3 may have a width of between 27 and 30 mm, which is still narrow enough to be inserted into the hole of a standard sized bottle typically used as a reagent receptacle in a tissue processing apparatus.

The measurement probe 250 includes first and second measurement surfaces 261, 262. The first measurement surface 261 is a cylindrical wall that defines a sample chamber that is open at opposite ends to allow reagent in the reagent receptacle 220 to pass through the sample chamber. The second measurement surface 262 is an elongate element housed coaxially within the cylindrical wall provided by the first measurement surface 261.

An input cable 270 electrically connects the signal generating circuitry 140 of the tissue processing apparatus to the second measurement surface 262. The input cable 270 is attached (in this example by soldering) to the second measurement surface 262 within a heat shrink 275. The first measurement surface 261 is connected to the signal processing unit (provided by the circuitry 230) by a return cable 280, which is electrically connected to the first measurement surface 261 by a return clamp 285. The input cable 270 and return cable 280 together form respective parts of a coaxial cable 282 which connects back to the tissue processing apparatus 100.

The input cable 270 enters the sample chamber at a cable end of the sample chamber, where it is secured in place by a cable end cap 291. Likewise, the second measurement surface 262 is secured in place at a measurement end of the sample chamber by a measurement end cap 292. The measurement end cap 292 is configured to secure the second measurement surface 262 so as to be spaced apart from the first measurement surface 261, with the first measurement surface 261 and the second measurement surface 262 being coaxial with each other.

In use, the tissue processing apparatus 100 provides an indication to a user (e.g. via the display 135, via a mobile phone application, and/or via a message sent to a mobile phone belonging to the user) to connect the inlet tube 210 (which for the purposes of this example may for example be the first inlet tube 110 a or the second inlet tube 110 b) to a reagent receptacle containing reagent of a specified type and state (e.g. 100% alcohol). After the user has connected the inlet tube 210 to the reagent receptacle 220 (which may for the purposes of this example may be the first reagent receptacle 120 a or the second reagent receptacle 120 b) by inserting the inlet tube 210 into the reagent receptacle 220 so that the two measurement surfaces 261, 262 are at least partially immersed in reagent contained in the reagent receptacle 220, the tissue processing apparatus 100 uses the two measurement surfaces 261, 262 of the measurement probe 250 to obtain at least one electrical measurement of the reagent contained in the reagent receptacle 220.

To obtain the at least one electrical measurement of the reagent contained in the reagent receptacle 220, the signal generating circuitry 140 generates an electrical test signal, which is supplied to the second measurement surface 262 via the input cable 270. An electrical signal received from the first measurement surface 261 in consequence of the electrical test signal having been supplied to the second measurement surface 262 (caused by capacitive coupling of the first and second measurement surfaces 261, 262) is then received by and processed by the signal processing circuitry 230 to provide at least one electrical measurement, which is relayed to the control unit 130.

In this example, the at least one electrical measurement is indicative of the capacitance of the reagent contained in the reagent receptacle 220.

Equally, it would be possible for the at least one electrical measurement to be indicative of the capacitance and resistance of the reagent contained in the reagent receptacle 220, or to be indicative of just the resistance of the reagent.

In some embodiments, either/both of the first and second measurement surfaces 261, 262 may have a layer of electrical insulation formed thereon, but in this case it would not be possible to use the first and second measurement surfaces 261, 262 to obtain an electrical measurement indicative of the resistance of the reagent.

Next, the tissue processing apparatus 100 determines, based on the electrical measurement indicative of the capacitance of the reagent contained in the reagent receptacle 220, a state and a type of reagent contained in the reagent receptacle 220 by comparing the electrical measurement with at least one reference value (based on an "absolute comparison"). The at least one reference value may be determined empirically, e.g. as discussed below with reference to FIG. 7.

Next, if the determined state and/or type of reagent contained in the reagent receptacle 220 does not match the specified state and/or type (e.g. within a predetermined threshold), the tissue processing apparatus 100 provides an indication to the user, via the display 135, that the reagent contained in the reagent receptacle 220 does not match the specified state and/or type.

Optionally, the tissue processing apparatus 100 may be configured to, if the determined state and/or type of reagent contained in the reagent receptacle 220 does not match the specified state and/or type, prevent the inlet tube 210 from taking out reagent from the reagent receptacle 220, e.g. until the inlet tube 210 is inserted into a reagent receptacle containing reagent that is determined to have a state and/or type that matches the specified state and/or type; and/or until a predetermined override procedure is carried out by a user of the tissue processing apparatus 100.

In this way, if the inlet tube 210 is inserted into a reagent receptacle containing reagent that does not match the specified state and/or type, then the tissue processing apparatus 100 can be prevented from using that reagent.

Figure 4:
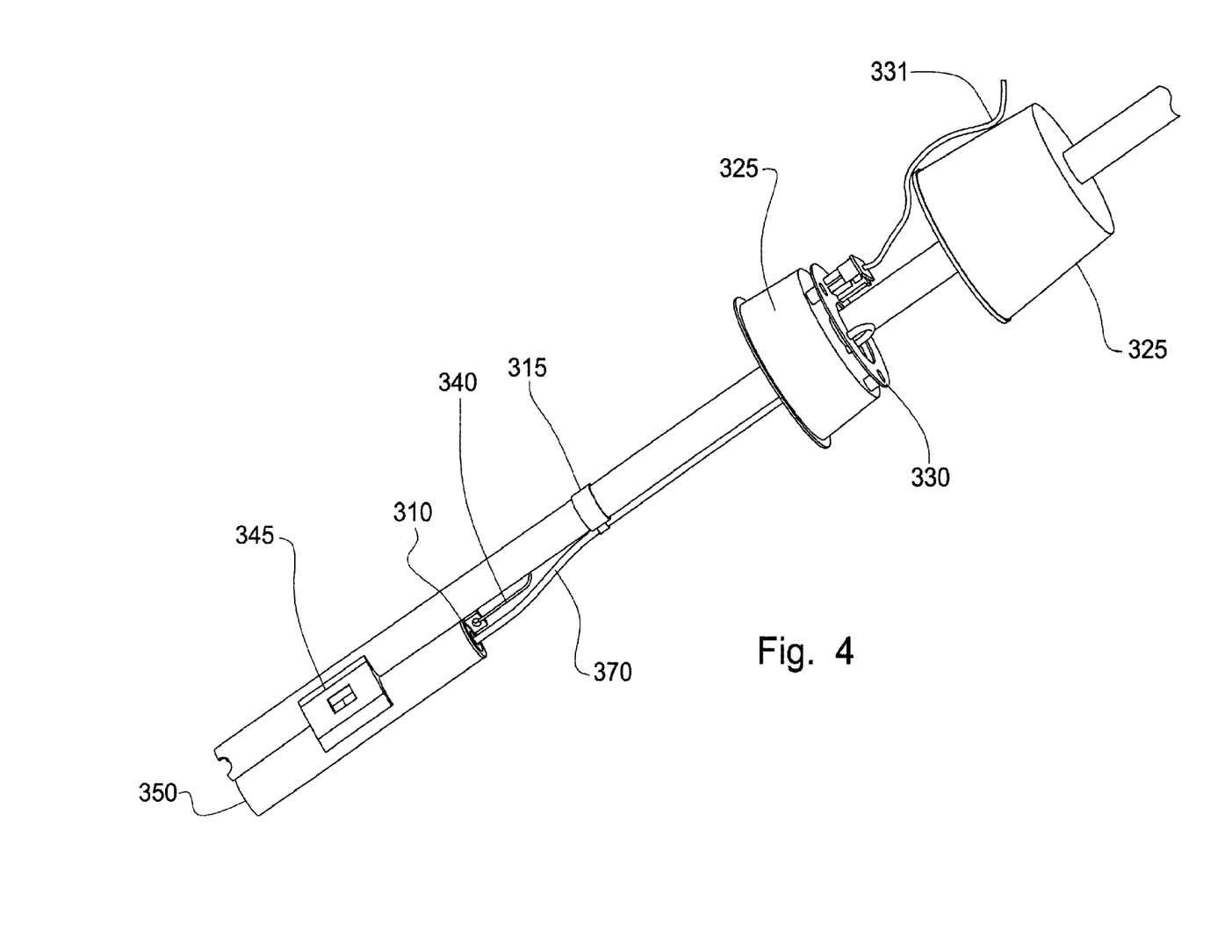
FIG. 4 is a schematic diagram of a second example of the measurement probe suitable for use in the tissue processing apparatus of FIG. 1.
Figure 5:
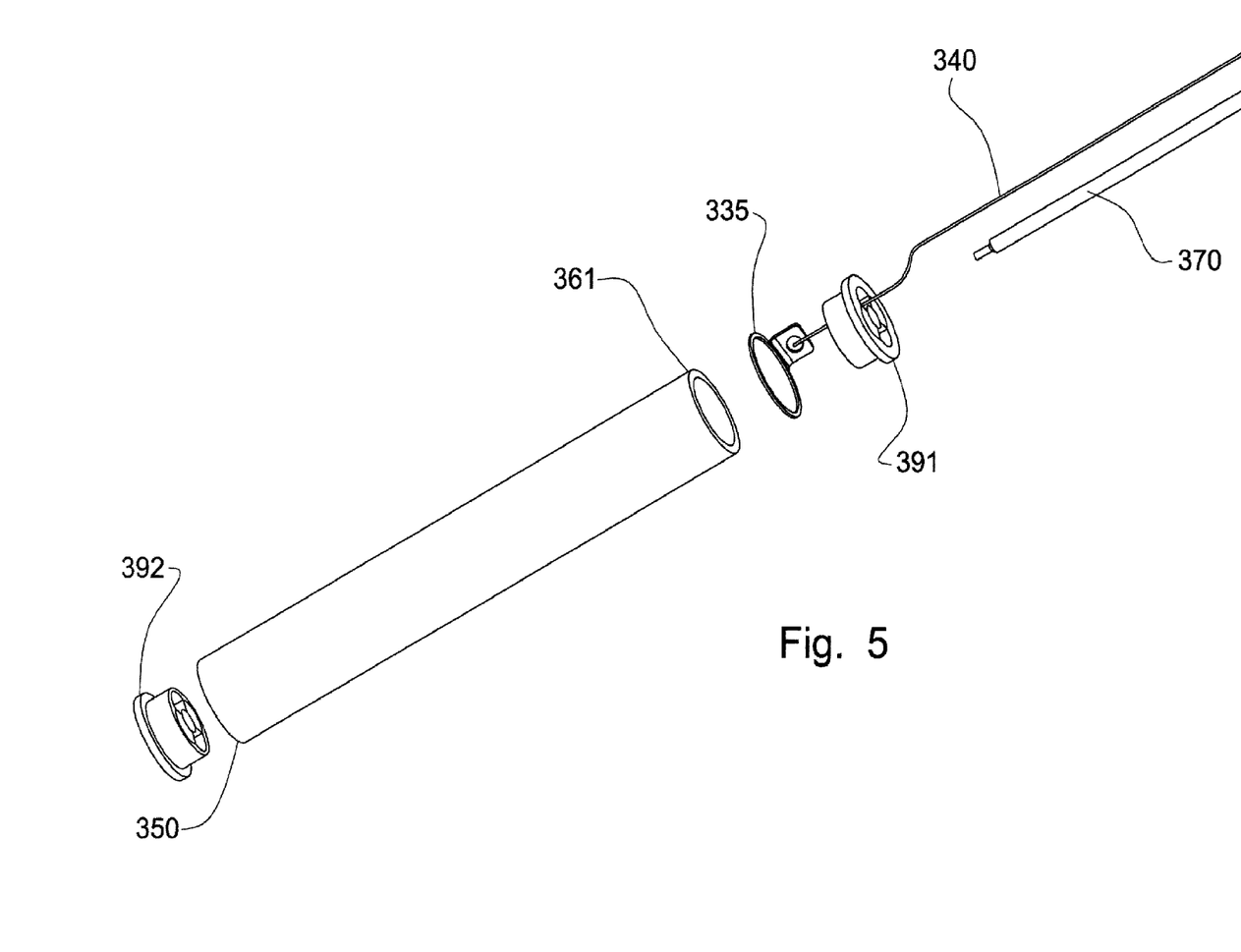
FIG. 5 is an exploded diagram of the measurement probe of FIG. 4.

FIG. 4 and FIG. 5 show a second example of a measurement probe 350 suitable for use in the tissue processing apparatus 100 of FIG. 1. Corresponding reference numerals have been used for corresponding features which have previously been described. Such features are therefore only described to the extent that they deviate significantly from the measurement probe shown in FIGS. 2 and 3.

The measurement probe 350 shown in FIGS. 4 and 5 has essentially the same structure as the measurement probe 250 of FIGS. 2 and 3, and could be used in the tissue processing apparatus of FIG. 1 in much the same way as the the measurement probe 250 of FIGS. 2 and 3.

Where the measurement probe 350 shown in FIGS. 4 and 5 differs from the measurement probe 250 of FIGS. 2 and 3 is in the mounting of the measurement probe 350 to the inlet tube 310. In particular, the measurement probe 350 shown in FIGS. 4 and 5 is mounted to the inlet tube 310 via a probe attachment clip 345. A cable attachment clip 315 attaches the input cable 370 to the inlet tube 310 at a location between the measurement probe 350 and the cap 325. Also illustrated in FIG. 4 is a connecting cable 331, which connects the circuitry 330 to the control unit 130 of the tissue processing apparatus.

FIG. 5 shows an exploded view of the measurement probe 350 illustrated in FIG. 4.

As shown in FIG. 5, a ground ring 335 is disposed between the first measurement surface 361 and the cable end cap 391 of the measurement probe 350. The ground ring 335 is connected to a ground wire 340. The combination is configured to ensure that the measurement probe is suitably grounded, so as to improve the accuracy of the electrical measurements obtained.

FIG. 6 illustrates an example waveform for an electrical test signal that could be generated by the signal generating circuitry 140. The illustrated test signal is a 16 kHz stepped AC voltage waveform that oscillates between three discrete voltages with a peak to peak voltage of 2.5V. The use of such a stepped waveform for the electrical test signal makes it easier to identify the shift in the phase/amplitude of the resulting electrical signal, and therefore obtain electrical measurements indicative of capacitance and resistance of a reagent. Other AC voltage waveforms may be used. Whilst it is conceivable that a DC voltage could also be used, testing has shown that this does not always produce satisfactory results when working with Hydrocarbon solvents.

Figure 7:
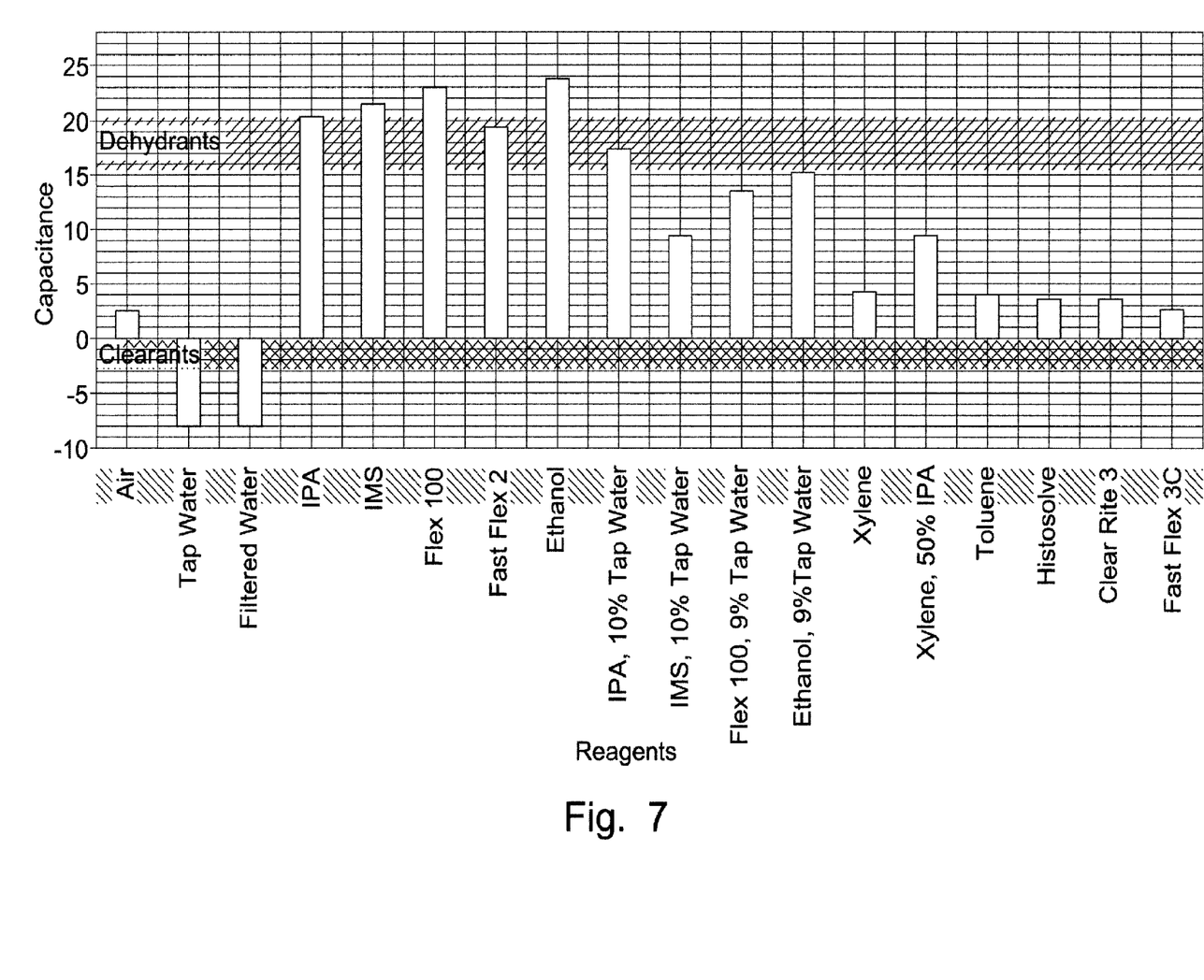
FIG. 7 is a bar chart showing capacitance measurements obtained for reagents having various different states and types.

FIG. 7 is a bar chart showing capacitance measurements obtained for reagents having various different states and types.

In particular, FIG. 7 shows capacitance measurements, obtained using the measurement probe 250 of FIGS. 2 and 3, when immersed in reagents having various states and types that might be used in a tissue processing apparatus. The capacitances of the reagents having different states and types are shown to be distinct, and thus FIG. 7 demonstrates that the state and/or type of the reagent can be determined based on a capacitance measurement obtained using the measurement probe 250 of FIGS. 2 and 3.

When used in this specification and claims, the terms "comprises" and "comprising", "including" and variations thereof mean that the specified features, steps or integers are included. The terms are not to be interpreted to exclude the possibility of other features, steps or integers being present.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

All references referred to above are hereby incorporated by reference.

The following statements, which are not claims, provide general expressions of the disclosure herein.

A1. A tissue processing apparatus for processing biological tissue, the tissue processing apparatus comprising: a measurement probe that includes two measurement surfaces spaced apart from each other, wherein the measurement probe is configured to be inserted into a reagent receptacle so that the two measurement surfaces are at least partially immersed in reagent contained in the reagent receptacle; wherein the tissue processing apparatus is configured to use the two measurement surfaces of the measurement probe to obtain at least one electrical measurement of reagent contained in the reagent receptacle before reagent is taken out from the reagent receptacle by the tissue processing apparatus; wherein the tissue processing apparatus is configured to determine, based on the at least one electrical measurement, a state and/or a type of reagent contained in the reagent receptacle.

A2. A tissue processing apparatus according to statement A1 having an extraction device configured to take reagent out of the reagent receptacle, when connected to the reagent receptacle.

A3. A tissue processing apparatus according to statement A2, wherein the extraction device is an inlet tube configured to take reagent out of the reagent receptacle via a reagent opening in the inlet tube, when inserted into the reagent receptacle.

A4. A tissue processing apparatus according to statement A3, wherein the measurement probe is mounted to the inlet tube.

A5. A tissue processing apparatus according to statement A4, wherein the measurement probe is mounted to the inlet tube such that at least part of the measurement probe is located adjacent to the reagent opening in the inlet tube.

A6. A tissue processing apparatus according to statement A4 or A5, wherein the inlet tube has one or more walls which define a compartment configured to house the measurement probe.

A7. A tissue processing apparatus according to statement A6, wherein the one or more walls which define the compartment are formed integrally with the remainder of the inlet tube.

A8. A tissue processing apparatus according to any preceding statement, wherein the measurement probe has a sample chamber and wherein one of the two measurement surfaces includes at least one wall of the sample chamber.

A9. A tissue processing apparatus according to any preceding statement, wherein the tissue processing apparatus includes signal generating circuitry configured to generate an electrical test signal that is supplied to at least one of the two measurement surfaces, and signal processing circuitry configured to obtain the at least one electrical measurement by processing an electrical signal received from at least one of the two measurement surfaces in consequence of the electrical test signal having been supplied to at least one of the two measurement surfaces.

A10. A tissue processing apparatus according to statement A9, wherein the signal processing circuitry includes circuitry housed in a cap for use with a reagent receptacle.

A11. A tissue processing apparatus according to any preceding statement, wherein the tissue processing apparatus is configured to: provide an indication to a user to connect an extraction device of the tissue processing apparatus to a reagent receptacle containing reagent of a specified type and state; after the user has connected the extraction device to a reagent receptacle: using the two measurement surfaces of the measurement probe to obtain at least one electrical measurement of reagent contained in the reagent receptacle before reagent is taken out from the reagent receptacle by the extraction device; determining, based on the at least one electrical measurement, a state and/or a type of reagent contained in the reagent receptacle; if the determined state and/or type of reagent contained in the reagent receptacle does not match the specified state and/or type, provide an indication to the user that the reagent contained in the reagent receptacle connected to the extraction device does not match the specified state and/or type.

A12. A tissue processing apparatus according to statement A11, wherein the specified type and state of reagent is a dehydrant having a concentration of 90% or higher, or a hydrocarbon solvent having a concentration of 90% or higher.

A13. A tissue processing apparatus according to any preceding statement, wherein the tissue processing apparatus includes first and second measurement probes, wherein the first measurement probe is mounted to a first inlet tube of the tissue processing apparatus and configured to be inserted into a first reagent receptacle, wherein the second measurement probe is mounted to a second inlet tube of the tissue processing apparatus and configured to be inserted into a second reagent receptacle, wherein the tissue processing apparatus is configured to: provide an indication to a user to connect the first inlet tube of the tissue processing apparatus to a first reagent receptacle containing reagent of a first specified type and state; after the user has inserted the first inlet tube into a first reagent receptacle: using the two measurement surfaces of the first measurement probe to obtain at least one electrical measurement of reagent contained in the first reagent receptacle before reagent is taken out from the first reagent receptacle by the first inlet tube; determining, based on the at least one electrical measurement, a state and/or a type of reagent contained in the first reagent receptacle; if the determined state and/or type of reagent contained in the first reagent receptacle does not match the first specified state and/or type, provide an indication to the user that the reagent contained in the first reagent receptacle does not match the first specified state and/or type; provide an indication to a user to connect the second inlet tube of the tissue processing apparatus to a second reagent receptacle containing reagent of a second specified type and state; after the user has inserted the second inlet tube into a second reagent receptacle: using the two measurement surfaces of the second measurement probe to obtain at least one electrical measurement of reagent contained in the second reagent receptacle before reagent is taken out from the second reagent receptacle by the second inlet tube; determining, based on the at least one electrical measurement, a state and/or a type of reagent contained in the second reagent receptacle; if the determined state and/or type of reagent contained in the second reagent receptacle does not match the second specified type and/or state, provide an indication to the user that the reagent contained in the second reagent receptacle does not match the second specified state and/or type.

A14. A tissue processing apparatus according to statement A13, wherein: the first specified type and state of reagent is a dehydrant having a concentration of 90% or higher; the second specified type and state of reagent is a hydrocarbon solvent having a concentration of 90% or higher.

A15. A method of using a tissue processing apparatus according to the first aspect of the invention, wherein the method includes: inserting the measurement probe into a reagent receptacle containing reagent so that the two measurement surfaces of the measurement probe are at least partially immersed in reagent contained in the reagent receptacle; using the two measurement surfaces of the measurement probe to obtain at least one electrical measurement of reagent contained in the reagent receptacle before reagent is taken out from the reagent receptacle by the tissue processing apparatus; determining, based on the at least one electrical measurement, a state and/or a type of the reagent contained in the reagent receptacle.

A16. A measurement probe configured to be used in a tissue processing apparatus according to one of statements A1 to A14.

A17. A tissue processing apparatus substantially as any one embodiment herein described with reference to and as shown in the accompanying drawings.

The invention claimed is:

1. A tissue processing apparatus configured to process biological tissue by treating the biological tissue with a plurality of reagents and then with an embedding medium, the tissue processing apparatus comprising:
an extraction device, wherein the extraction device is an inlet tube configured to take reagent out of a reagent receptacle via a reagent opening, when inserted into the reagent receptacle;
a measurement probe, mounted to the inlet tube, that includes two measurement surfaces spaced apart from each other, wherein the measurement probe is configured to be inserted into the reagent receptacle so that the two measurement surfaces are at least partially immersed in reagent contained in the reagent receptacle;
wherein the tissue processing apparatus is configured to provide an indication to a user to connect the extraction device of the tissue processing apparatus to the reagent receptacle containing reagent of a specified type and concentration;
wherein the tissue processing apparatus is configured to, after the user has connected the extraction device to the reagent receptacle:
use the two measurement surfaces of the measurement probe to obtain at least one electrical measurement of reagent contained in the reagent receptacle before reagent is taken out from the reagent receptacle by the extraction device;
determine, based on the at least one electrical measurement, a concentration and/or a type of reagent contained in the reagent receptacle; and if the determined concentration and/or type of reagent contained in the reagent receptacle does not match the specified concentration and/or type:
provide an indication to the user that the reagent contained in the reagent receptacle connected to the extraction device does not match the specified concentration and/or type; and
prevent the extraction device from taking out reagent from the reagent receptacle.

2. A tissue processing apparatus according to claim 1, wherein the tissue processing apparatus is configured to determine, based on the at least one electrical measurement, a type of reagent contained in the reagent receptacle; and
if the determined type of reagent contained in the reagent receptacle does not match the specified type, provide an indication to the user that the reagent contained in the reagent receptacle connected to the extraction device does not match the specified type.

3. A tissue processing apparatus according to claim 1, wherein the specified type and concentration of reagent is a dehydrant having a concentration of 90% or higher, or a hydrocarbon solvent having a concentration of 90% or higher.

4. A tissue processing apparatus according to claim 1, wherein the tissue processing apparatus further includes a second measurement probe that includes two measurement surfaces spaced apart from each other, wherein the second measurement probe is mounted to a second inlet tube of the tissue processing apparatus and configured to be inserted into a second reagent receptacle such that the two measurement surfaces are at least partially immersed in reagent contained in the second reagent receptacle, wherein the tissue processing apparatus is further configured to:
provide an indication to a user to connect the second inlet tube of the tissue processing apparatus to the second reagent receptacle containing reagent of a second specified type and concentration;
after the user has inserted the second inlet tube into a second reagent receptacle:
using the two measurement surfaces of the second measurement probe to obtain at least one electrical measurement of reagent contained in the second reagent receptacle before reagent is taken out from the second reagent receptacle by the second inlet tube;

determining, based on the at least one electrical measurement, a concentration and/or a type of reagent contained in the second reagent receptacle;
if the determined concentration and/or type of reagent contained in the second reagent receptacle does not match the second specified type and/or concentration, provide an indication to the user that the reagent contained in the second reagent receptacle does not match the second specified concentration and/or type.

5. A tissue processing apparatus according to claim 4, wherein:
the first specified type and concentration of reagent is a dehydrant having a concentration of 90% or higher;
the second specified type and concentration of reagent is a hydrocarbon solvent having a concentration of 90% or higher.

6. A tissue processing apparatus according to claim 1, wherein the/each measurement probe is mounted to the/each inlet tube such that at least part of the/each measurement probe is located adjacent to the reagent opening in the/each inlet tube.

7. A tissue processing apparatus according to claim 6, wherein the/each inlet tube has one or more walls which define a compartment configured to house the/each measurement probe.

8. A tissue processing apparatus according to claim 7, wherein the one or more walls which define the compartment are formed integrally with the remainder of the/each inlet tube.

9. A tissue processing apparatus according to claim 1, wherein the/each measurement probe has a sample chamber and wherein one of the two measurement surfaces of the/each measurement probe includes at least one wall of the sample chamber.

10. A tissue processing apparatus according to claim 1, wherein the tissue processing apparatus includes signal generating circuitry configured to generate an electrical test signal that is supplied to at least one of the two measurement surfaces, and signal processing circuitry configured to obtain the at least one electrical measurement by processing an electrical signal received from at least one of the two measurement surfaces in consequence of the electrical test signal having been supplied to at least one of the two measurement surfaces.

11. A tissue processing apparatus according to claim 10, wherein the signal processing circuitry includes circuitry housed in a cap for use with a reagent receptacle.

12. A method of using a tissue processing apparatus according to claim 1, wherein the method includes:
providing an indication to a user to connect an extraction device of the tissue processing apparatus to a reagent receptacle containing reagent of a specified type and concentration;
inserting the measurement probe into the reagent receptacle containing reagent so that the two measurement surfaces of the measurement probe are at least partially immersed in reagent contained in the reagent receptacle;
after the user has connected the extraction device to a reagent receptacle: using the two measurement surfaces of the measurement probe to obtain at least one electrical measurement of reagent contained in the reagent receptacle before reagent is taken out from the reagent receptacle by the tissue processing apparatus;
determining, based on the at least one electrical measurement, a concentration and/or a type of the reagent contained in the reagent receptacle; and
if the determined concentration and/or type of reagent contained in the reagent receptacle does not match the specified concentration and/or type:
providing an indication to the user that the reagent contained in the reagent receptacle connected to the extraction device does not match the specified concentration and/or type; and
preventing the extraction device from taking out reagent from the reagent receptacle.

13. A tissue processing apparatus according to claim 1, wherein the tissue processing apparatus is configured to, if the determined concentration and/or type of reagent contained in the reagent receptacle does not match the specified concentration and/or type, prevent the extraction device from taking out reagent from the reagent receptacle until: (i) the extraction device is connected by the user to a reagent receptacle containing reagent that is determined to have a state and/or type that matches the specified state or type, and/or (ii) a predetermined override procedure is carried out by a user of the tissue processing apparatus.

14. A method according to claim 12, wherein the method includes, if the determined concentration and/or type of reagent contained in the reagent receptacle does not match the specified concentration and/or type, preventing the extraction device from taking out reagent from the reagent receptacle until: (i) the extraction device is connected by the user to a reagent receptacle containing reagent that is determined to have a state and/or type that matches the specified state or type, and/or (ii) a predetermined override procedure is carried out by a user of the tissue processing apparatus.

* * * * *